US010410524B2

(12) United States Patent
Norwood (10) Patent No.: US 10,410,524 B2
(45) Date of Patent: Sep. 10, 2019

(54) SYSTEMS AND METHODS OF AN OVERTAKING LANE CONTROL

(71) Applicant: Ford Global Technologies LLC, Dearborn, MI (US)

(72) Inventor: Andrew John Norwood, Ivanhoe (AU)

(73) Assignee: Ford Global Technologies LLC, Dearborn, MI (US)

(*) Notice: Subject to any disclaimer, the term of this patent is extended or adjusted under 35 U.S.C. 154(b) by 18 days.

(21) Appl. No.: 15/662,683

(22) Filed: Jul. 28, 2017

(65) Prior Publication Data

US 2018/0033309 A1  Feb. 1, 2018

(30) Foreign Application Priority Data

Jul. 29, 2016  (CN) .......................... 2016 1 0621002

(51) Int. Cl.

| G08G 1/16 | (2006.01) |
|---|---|
| B62D 15/02 | (2006.01) |
| G06K 9/00 | (2006.01) |
| G01S 13/93 | (2006.01) |
| G06K 9/46 | (2006.01) |

(52) U.S. Cl.
CPC .......... *G08G 1/167* (2013.01); *B62D 15/025* (2013.01); *B62D 15/029* (2013.01); *G06K 9/00798* (2013.01); *G06K 9/00805* (2013.01); *B60R 2300/804* (2013.01); *B60T 2201/08* (2013.01); *B60T 2201/089* (2013.01); *G01S 2013/9332* (2013.01); *G01S 2013/9353* (2013.01); *G06K 9/4652* (2013.01)

(58) Field of Classification Search
CPC ................ B62D 15/025; B62D 15/029; G06K 9/00798; G06K 9/00805; G08G 1/167; B60R 2300/804; B60T 2201/08; B60T 2201/089; G01S 2013/9332; G01S 2013/9353

See application file for complete search history.

(56) References Cited

U.S. PATENT DOCUMENTS

| 5,521,579 | A | * | 5/1996 | Bernhard | ........... B60K 31/0008 180/167 |
|---|---|---|---|---|---|
| 5,959,552 | A | | 9/1999 | Cho | |
| 6,311,119 | B2 | | 10/2001 | Sawamoto et al. | |
| 9,156,473 | B2 | | 10/2015 | Clarke et al. | |
| 9,245,448 | B2 | | 1/2016 | Schofield | |
| 9,963,127 | B2 | * | 5/2018 | Pilutti | ....................... B60T 7/22 |
| 2003/0025597 | A1 | * | 2/2003 | Schofield | ............... B60Q 1/346 340/435 |

(Continued)

FOREIGN PATENT DOCUMENTS

| CN | 103065501 A | 4/2013 |
|---|---|---|
| GB | 2401956 A | 11/2004 |

*Primary Examiner* — Mekonen T Bekele
(74) *Attorney, Agent, or Firm* — Frank Lollo; Kolitch Romano LLP (57) ABSTRACT

An overtaking lane control system in a vehicle comprises a lane determination unit to recognize road configuration; an obstacle monitoring unit to detect approaching vehicles in adjacent lanes; and an overtaking lane control unit to issue a first alert to a driver to warn the driver to return to a normal lane when the overtaking lane control unit determines that the vehicle has traveled in an overtaking lane for a first predetermined time and it is safe to change to the normal lane.

20 Claims, 4 Drawing Sheets

(56) References Cited

U.S. PATENT DOCUMENTS

| | | | |
|---|---|---|---|
| 2007/0067100 A1* | 3/2007 | Matsumoto | G01C 21/26 |
| | | | 701/301 |
| 2009/0245582 A1* | 10/2009 | Sakamoto | G06K 9/00798 |
| | | | 382/104 |
| 2012/0078484 A1* | 3/2012 | Kato | B60W 30/143 |
| | | | 701/96 |
| 2014/0111647 A1 | 4/2014 | Atsmon et al. | |
| 2015/0355641 A1* | 12/2015 | Choi | G05D 1/021 |
| | | | 701/23 |
| 2015/0360684 A1* | 12/2015 | Matsuno | B60Q 9/00 |
| | | | 701/23 |
| 2015/0360721 A1* | 12/2015 | Matsuno | B62D 15/0255 |
| | | | 701/41 |
| 2016/0185279 A1* | 6/2016 | Zagorski | B60Q 1/34 |
| | | | 701/36 |
| 2017/0183007 A1* | 6/2017 | Oh | B60W 30/16 |
| 2017/0248958 A1* | 8/2017 | Smith | B60R 11/04 |
| 2017/0361762 A1* | 12/2017 | Wunsche, III | G08G 1/22 |
| 2018/0154894 A1* | 6/2018 | Norwood | B60W 30/143 |
| 2018/0157257 A1* | 6/2018 | Hashimoto | G05D 1/0088 |
| 2018/0293894 A1* | 10/2018 | Zhang | G08G 1/167 |
| 2018/0357890 A1* | 12/2018 | Fowe | G08G 1/0112 |

\* cited by examiner

SYSTEMS AND METHODS OF AN OVERTAKING LANE CONTROL

RELATED APPLICATION

This application claims the benefit of Chinese Patent Application No.: CN 201610621002.1 filed on Jul. 29, 2016, the entire contents thereof being incorporated herein by reference.

FIELD

The present disclosure relates to a system and a method for an overtaking lane control, in particular, relates to a system and a method to alert a driver to change from an overtaking lane to a normal travelling lane.

BACKGROUND OF THE INVENTION

On a multi-lane highway or a freeway, there is usually an overtaking lane or a passing lane. In North American countries such as the United States, the overtaking lane is a lane nearest to a center of the road or an inner lane. The overtaking lane is designed for passing, thus allowing the motorist to travel at their own pace. In some jurisdictions, it is illegal to use the overtaking lane as a travelling lane as opposed to passing. However, it is not uncommon that the vehicles stay in the overtaking lane and sometimes the vehicles travel at a speed below the posted speed in the overtaking lane. The inventor has recognized that some drivers may not be aware that they drive in the overtaking lane longer than permitted by the law or they do not know the law on the overtaking lane. It is desired to have a system and method to alert the driver to return to the normal lane at a safe condition.

SUMMARY

According to one aspect of the present disclosure, an overtaking lane control system in a vehicle is disclosed. The overtaking lane control system may comprise a lane determination unit to recognize road configuration; an obstacle monitoring unit to detect approaching vehicles in adjacent lanes; and an overtaking lane control unit to issue a first alert to a driver to warn the driver to return to a normal lane when the overtaking lane control unit determines that the vehicle has traveled in an overtaking lane for a first predetermined time and it is safe to change to the normal lane.

In one embodiment, the lane determination unit may include a camera that recognizes the overtaking lane based on color and position of road lines.

In another embodiment, the lane determination unit may include a lane keep assist system and the obstacle monitoring unit may include a blind spot monitoring system of the vehicle.

In another embodiment, the overtaking lane control unit may further determine whether the driver has an intent to change the lane after the first alert is issued.

In another embodiment, the overtaking lane control unit may determine whether the driver has an intent to change the lane based on information from the lane determination unit, a turn signal device or a steering wheel position sensor.

In another embodiment, the overtaking lane control unit may issue a second alert to the driver to warn the driver to return to the normal lane when the overtaking lane control unit determines that the driver has no intent to change the lane after the first alert, the vehicle travels in the overtaking lane for a second predetermined time and it is safe to return to the normal lane.

In another embodiment, the overtaking lane control system may further comprise a navigation unit to determine whether the vehicle travels on a highway or a freeway, and the lane determination unit may be activated when it is determined that the vehicle travels on the highway or the freeway.

In another embodiment, overtaking lane control system may further include an alert device at an instrumental panel, wherein the first alert is lighting, a verbal display or an audio warning generated by the alert device.

In another embodiment, the alert device may be a human machine interaction (HMI) device in the vehicle.

According to another aspect, an overtaking lane control system in a vehicle is disclosed. The system may include a lane determination unit to recognize road configuration; an obstacle monitoring unit to detect approaching vehicles in adjacent lanes and obstacles; an overtaking lane control unit to issue a first alert to a driver for returning to a normal lane when it is determined that the vehicle has traveled in an overtaking lane for a first predetermined time and it is safe to return to the normal lane and an alert device to generate the first alert.

In one embodiment, the alert device may generate an audible warning, a visual display or a combination of the audible warning and the visual display.

In another embodiment, the overtaking lane control system may further include an HMI device and a navigation device, and the overtaking lane control unit may determine an applicable overtaking lane regulation based on a vehicle location information from the navigation device and display the applicable overtaking lane regulation to the driver on the HMI device as one of alert formats.

In another embodiment, the overtaking lane control unit may issue a second alert when it is determined that the vehicle has traveled in an overtaking lane for a second predetermined time, and the driver does not intend to change a lane and it is safe to return to the normal lane.

According to another aspect of the present disclosure, a method of overtaking lane control is disclosed. The method may comprise determining whether the vehicle is travelling in an overtaking lane; monitoring presence of approaching vehicles in adjacent lanes and obstacles; recording a time when the vehicle has traveled in the overtaking lane; and issue a first alert to warn a driver to return to a normal lane when the time reaches a first predetermined value and it is safe to return to the normal lane.

In one embodiment, the method may further comprise logging into a "safe return to normal lane" status and recording the time may start after the "safe return to normal lane" status is logged.

In another embodiment, the method may further comprise determining if the driver intends to return to the normal lane after issuance of the first alert and issuing a second alert when it is determined that the driver has no intent to return to the normal lane and it is safe to return to the normal lane.

In another embodiment, a driver's intent to return to the normal lane may be determined by information from a turn signal device.

In another embodiment, a driver's intent to return to the normal lane may be determined by information from a steering wheel position sensor.

In another embodiment, the "safe to return to normal lane" status is cancelled when the presence of the vehicles in the adjacent lane or obstacles are detected and recording time is restarted.

In another embodiment, at least one of the first alert and the second alert includes a message of an applicable overtaking lane regulation.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods and structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
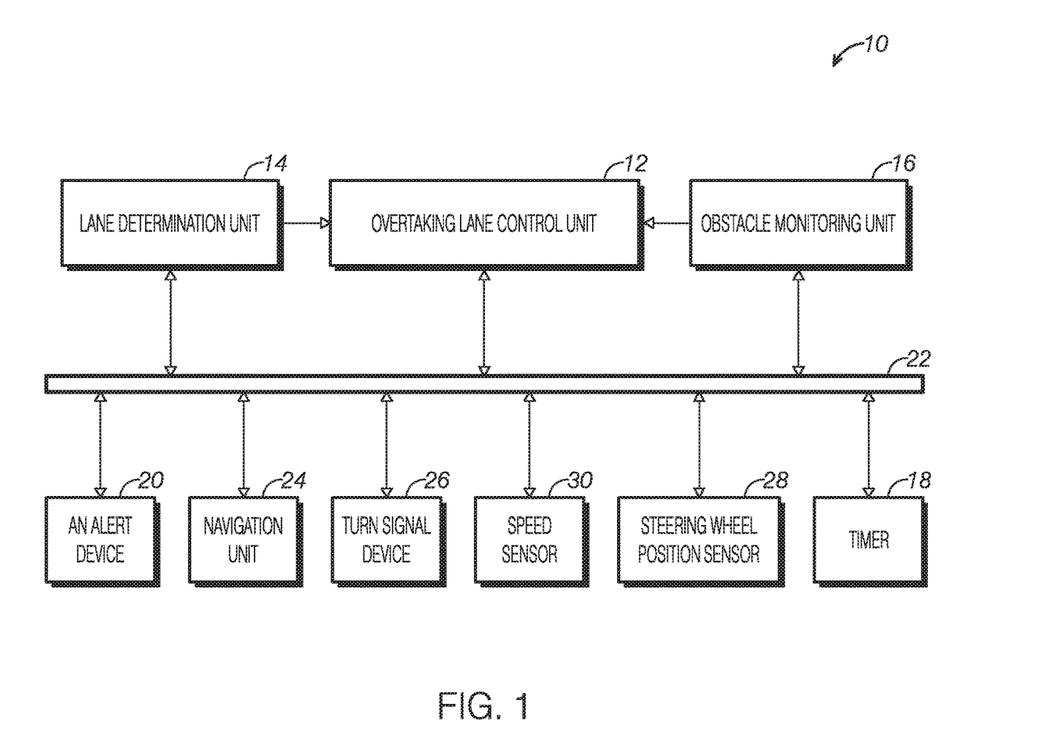
FIG. 1 is a schematic block diagram of an example overtaking lane control system according to the present disclosure.

FIG. 1 is a block diagram of an example overtaking lane control system 10 in a vehicle according to one embodiment of the present disclosure and illustrates the communications between the overtaking lane control system 10 and some electronic devices of the vehicle. The overtaking lane control system 10 may alert a driver to change from an overtaking lane to a normal travelling lane or a normal lane at certain conditions. The overtaking lane control system 10 may include an overtaking lane control unit 12, a lane determination unit 14 to determine road line configuration and an obstacle monitoring unit 16 to detect the vehicles and/or obstacle in adjacent lanes, a timer 18 and an alert device 20. In some embodiments, the overtaking lane control unit 12 may communicate with the lane determination unit 14 and the obstacle monitoring unit 16 directly as illustrated in FIG. 1. In some embodiments, the overtaking lane control unit 12 may communicate with the lane determination unit 14 and the obstacle monitoring unit 16 via a communication bus or a CAN bus 22 of the vehicle. Further, the overtaking lane control unit 12 may communicate with the timer 18 and an alert device 20 via the CAN bus 22.

The overtaking lane control unit 12 may include a processor that provides for computational resources and a memory. The overtaking lane control unit 12 may serve to execute instructions for software that may be loaded into the memory. The instructions may include program code, computer-usable program code, or computer-readable program code. The memory may be a storage device that is capable of storing information, such as, without limitation, data, program code in functional form, and/or other suitable information on either a temporary basis and/or a permanent basis. For example, the memory may include a random access memory or any other suitable volatile or non-volatile storage device and a persistent storage. The persistent storage may be one or more devices such as a hard drive, a flash memory, a rewritable optical disk, a rewritable magnetic tape, or some combination of the above.

The lane determination unit 14 may be a lane recognition device conventionally used in art. For example, the lane determination unit 14 may include a camera attached on front portions of a ceiling of a vehicle compartment and an image recognition device. The image recognition device may recognize front information such as a three-dimensional object and type/color of road lines in front of the vehicle and output the information on types of road lines, the number of the lanes and the vehicle position to the overtaking lane control unit 12. The overtaking lane control unit 12 may determine whether the vehicle is travelling in the overtaking lane based on the information. Alternatively or additionally, the overtaking lane control unit 12 may confirm the overtaking lane based a road sign captured by the camera. For example, the passing lanes may be acknowledged with signs using phrases such as "Slower Traffic Keep Right" or like. It should be appreciated that the overtaking lane control unit 12 may be customized to recognize the overtaking lane for vehicles in specific countries because of different overtaking lane configuration in different countries. For example, the overtaking lane is a left lane in the U.S. while the overtaking lane is right lane in the Australia and the U.K.

In some embodiments, the vehicle may include a lane keep assist system designed to alert the driver when the system detects that the vehicle is about to deviate from a traffic lane. A camera of the lane keep assist system can recognize the road structure such as white lines and yellow lines. The overtaking lane control unit 12 may communicate with the lane keep assist system, receive the information on the road structure, and determine the lane that the vehicle is travelling. In this way, no additional camera and image recognition device are required to determine the lane the vehicle is travelling other than the lane keep assist system already installed in the vehicle.

The obstacle monitoring unit 16 may be electronic detection devices to monitor the approaching vehicles in adjacent lanes (e.g., left and right to the vehicle). In some embodiments, the electronic devices may include any suitable sensors such as be radars that send out electromagnetic waves or cameras to capture computer-processed images. The electronic detection devices may be mounted on the sides of the vehicle such as in the vicinity of the external rear view mirrors or near the rear bumpers. The obstacle monitoring unit 16 may output information on the adjacent lanes to the overtaking lane control unit 12 so that overtaking lane control unit 12 can determine if it is safe to return to the normal lane. Such information may include presence of the approaching vehicle in the adjacent lanes, a distance between the vehicle and the approaching vehicles, and speed of the approaching vehicles for example.

In some embodiments, the vehicle may include a blind spot monitoring system to detect other vehicles located to the driver's side and rear using electronic detection devices and warn the driver the approaching vehicles. The overtaking lane control unit 12 may communicate with the blind spot monitoring system, receive the information on the approaching vehicles, and determine whether it is safe to return to the normal lane. In this way, no additional detection devices are required to monitoring the approaching vehicles other than the blind spot monitoring system already installed in the vehicle.

The timer 18 may record the time that the vehicle has traveled in the overtaking lane. The time recording may start when it is determined that it is safe to change from the overtaking lane to the normal lane or when it is determined that the vehicle is travelling in the overtaking lane.

When the time reaches a predetermined value and the overtaking lane control unit 12 determines that it is safe to make a return, the overtaking lane control unit 12 may issue an alert to warn the driver to return to the normal lane via the alert device 20. The alert device 20 may generate a visual warning such as lighting or verbal display, an audible warning, a combination of visual and audible warning or any suitable warning format. The alert device 20 may be located in an instrument panel of the vehicle. In some embodiments, the alert device 20 may be incorporated in a human machine interaction (HMI) device in the vehicle.

In some embodiments, the overtaking lane control system 10 may further include a navigation unit 24. The navigation unit 24 may be an individual unit. In some embodiments, the navigation unit 24 may be incorporated into the HMI device. In one example, the HMI device may include a navigation aspect as well as the overtaking lane warning feature among other features. The navigation unit 24 may determine whether the vehicle is travelling on a multi-lane highway or freeway. The overtaking lane control algorithm or process may be initiated when the navigation unit 24 determines that the vehicle is travelling on the multi-lane highway or freeway. The navigation unit 24 may further be used to determine whether the driver has changed to the normal travelling lane after the alert is issued.

In some embodiments, the overtaking lane control system 10 may further include a turn signal device 26. In other words, the overtaking lane control unit 12 may communicate with the turn signal device 26 of the vehicle. When the driver activates the turn signal device 26 by pushing a lever up or down for example, the information may be conveyed to the overtaking lane control unit 12 to indicate that the driver has intent to change lane.

In some embodiments, the overtaking lane control system 10 may further include a steering wheel position sensor 28. The steering position sensor 28 may monitor the driver's steering inputs including the angle of the steering wheel and/or the rate at which the driver is turning the wheel. In some vehicles, the information from the steering wheel position sensor may be used to vary hydraulic pressure in a variable-assist power steering system, or a stability control system to improve handling, braking and traction under changing driving conditions. The overtaking control unit 12 may communicate with the steering wheel position sensor 28 and receive information on the turning of the steering wheel to determine if the driver intends to change the lane.

Figure 2:
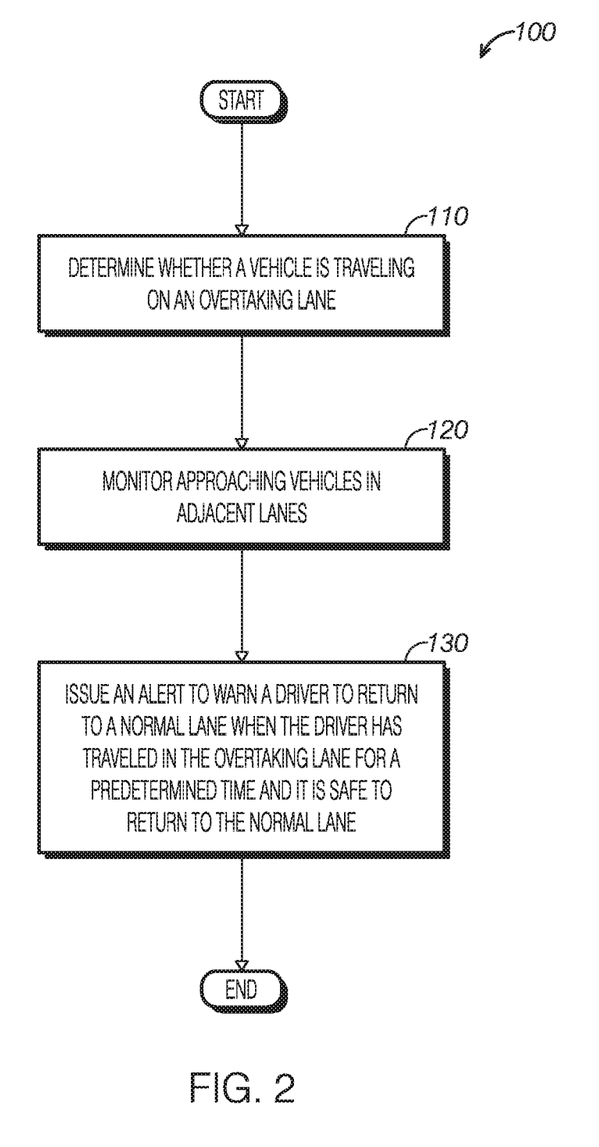
FIG. 2 shows a high-level flowchart for overtaking lane control according to the present disclosure.

Now turning to FIG. 2, a high-level flowchart is shown to illustrate an example method 100 for overtaking lane control according to the present disclosure. Method 100 may be executed by an overtaking lane control unit or a process in a vehicle management system. At 110, method 100) may determine whether a vehicle is travelling in an overtaking lane according to information from a lane determination unit. When it is determined that the vehicle is traveling in the overtaking lane, method 100 may monitor approaching vehicles in adjacent lanes based on information from the obstacle monitoring unit. The approaching vehicles may be vehicles driving in the left or right of the overtaking lane. Method 100 may monitor the parameters that can determine whether it is safe to change the lane. Such parameters may include but not limited to, the presence, position, distance and speed of the approaching vehicles. At 130, method 100 may issue an alert to warn a driver to return to a normal lane when the driver has traveled in the overtaking lane for a predetermined time T1 and it is safe to return to the normal lane. In some embodiments, method 100 may estimate a distance between the vehicle and approaching vehicle according to the speed of the vehicle and the estimated speed of the approaching vehicle and determine whether it is safe to return to the normal lane. It should be appreciated that any suitable technology can be used to determine whether it is safe to change a lane. In some embodiments, the time recording may start when it is determined that it is safe to return to the normal lane. The alert will be issued when the elapsed time has reached T1 and it is determined once again that it is safe to return to the normal lane at the time T1. In some embodiments, the time recording may start when it is determined that the vehicle is travelling in the overtaking lane. The alert will be issued when the elapsed time has reached T1 and it is determined that it is safe to return to the normal lane.

Figure 3:
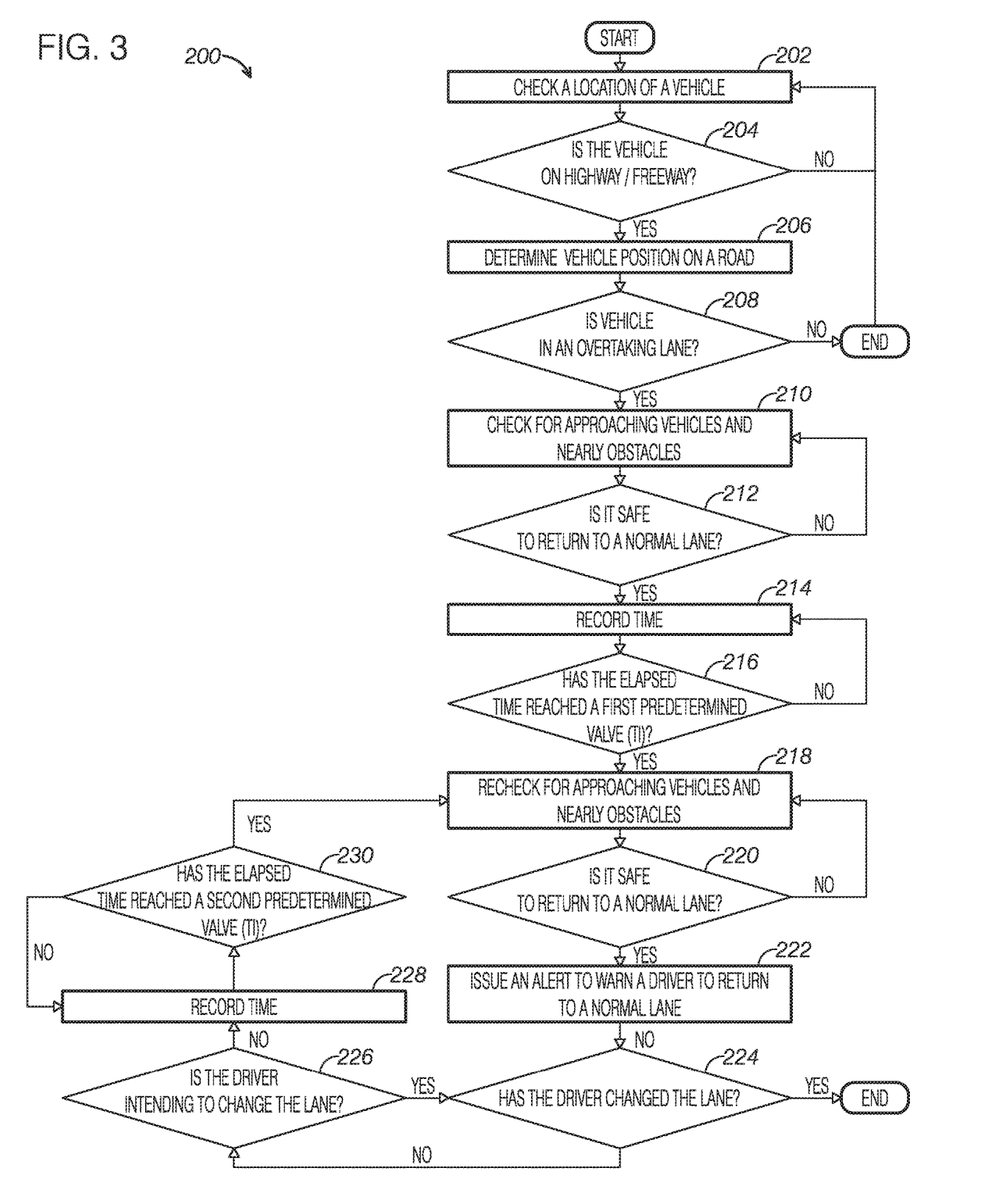
FIG. 3 shows an example method for overtaking lane control according to one embodiment of the present disclosure.

Now referring to FIG. 3, an example method 200 is shown for overtaking lane control according to one embodiment of the present disclosure. At 202, method 200 may include checking a location of a vehicle. The location of the vehicle may be found via a navigation unit that transmits signals from satellite or terrestrial sources to receivers such as Global Positioning System (GPS). The GPS employs multiple satellites that broadcast signals containing time and position data. The GPS receiver can use the signals to determine a location. In another example, the navigation unit may be a terrestrial positioning system that may employ signals from transmitters that are one or more stationary antennas in known locations. Signals from cell-phone towers, for example, can be used to calculate the location of a receiver. In yet another example, the positioning system may be a device that track location by dead reckoning. The dead-reckoning device may employ inertial navigation and/or sensors built into a vehicle. For example, a compass that measures direction combined with a drivetrain sensor that measures distance may provide position data such as a distance offset from a known starting point. It should be appreciated that the navigation unit may employ more than one technology. The navigation unit may output the location and the speed limit on the road.

At 204, method 200 may determine if the vehicle is travelling on a highway or a freeway. For example, the road type may be determined according to the information received from the navigation unit, such as the location and/or the speed limit. If the answer is no, the method 100 may return to 202, that is, the system may be passive when it is determined that the vehicle is not in the highway or freeway that has an overtaking lane.

If the answer is yes, method 200 continues to 206 where it determines a position of the vehicle on a road. The position of the vehicle on the road may be determined by a lane determination unit as described in FIG. 1. The camera or an image sensor of the lane determination unit may capture images in front of the vehicle to provide information on road configuration such as a number of lanes in the road and line type that divides the road (e.g., white line, yellow line or dashed line).

Next, at 208, method 200 determines if the vehicle is travelling in an overtaking lane according to the road configuration. Alternatively or additionally, method 200 may confirm that the vehicle is in the overtaking lane based on the information from a speed sensor in the vehicle when the speed sensor detects a speed only allowed in the overtaking lane. In yet another embodiment, the navigation unit may differentiate the road type and provide the information whether the vehicle is in the overtaking lane. If the answer is no, method 200 ends.

If the vehicle is confirmed to be in the overtaking lane, then at 210, method 200 may check for approaching vehicles and nearby obstacles. As described in FIG. 1, an obstacle monitoring unit may be used to check the approaching vehicles or obstacles. The cameras or the sensors of the obstacle monitoring unit may detect the presence of the approaching vehicles or nearby obstacles.

Next, at 212, method 200 may determine if it is safe to return to a normal lane. Method 200 may estimate clearance or space between the vehicle and the approaching vehicle according to the information from the obstacle monitoring unit and determine if it is safe to return to the normal lane. It should be appreciated that any suitable technology may be used to determine if it is safe to change a lane. In some embodiments, once sufficient clearance or space has been made to the approaching vehicle, a "safe to return" status may be logged.

If returning to the normal lane is confirmed to be safe or the "safe to return" status is logged, at 214, method 200 may start a timer to record the time that the vehicle has travelling at the overtaking lane since the "safe to return" status has been logged.

Next, method 200 may determine if the elapsed has reached a predetermined value T1 at 216. If the answer is yes, method 200 may recheck for approaching vehicles and nearby obstacles at 218.

Next, at 220, method 200 may determine if it is safe to return to the normal lane. If the answer is no, method 200 may return to step 218.

If the safe return is confirmed, at 222, method 200 may issue an alert or a first alert to warn a driver to return to the normal lane. The alert may be audible, visual, tactile or vibrating warning or the combination. For example, the alert may be a flashing light on a cluster on instrumental panel or on the side mirror or a written warning on the instrument panel's message center or a writing warning on a display of an HMI of the vehicle. In another example, the alert may be a sound.

Next, at 224, method 200 may determine if the driver has changed lane. In some embodiments, the lane determination unit may determine the position of the vehicle in the road to enable to determine whether the driver has changed lane. Method 200 may determine if the driver has changed lane according to the information from the lane determination unit. In some embodiments, the navigation unit may locate the position of the vehicle in a specific lane, that is, the navigation unit may provide information on the lane the vehicle is travelling. Method 200 may determine if the driver has changed lane according to the information from the navigation unit. If it is confirmed that the driver has changed lane, method 200 ends.

If it is determined that the vehicle is still in the overtaking lane, at 226, method 200 may further determine if the driver has intent to change the lane. Because the driver may more seriously contemplate moving out of the overtaking lane through receiving an additional alert, detection of the driver's intent and then issuance of an alert provide a user friendly feature. The driver's intent to change lane may be indicated by a turn signal device or a steering wheel position sensor.

Once the driver's intent to change lane is detected, method 200 may return to step 224 to confirm if the driver has changed lane. If there is no indication that the driver has intent to change lane, method 200 may continue to step 228 to record the time.

Next, at 230, method 200 may determine if the elapsed time reached a second predetermined value T2. T2 may be the same or different from the first predetermined value T1. If the answer at 230 is yes, method 200 may go to step 218 and then step 220. That is, method 200 again checks whether it is safe to return to the normal lane at time T2.

If the safe return status is confirmed, an alert will be issued. In some embodiments, the alert at the time T2 may be more intense than the alert at time T1. For example, the second alert may be a more intense audible alert. In another example, the second alert may be a combination of warning, audio alerts backed up by visual warning. In yet another example, method 200 may provide information on the local regulation on the overtaking lane as part of the alert. In some embodiments, method 200 may obtain the vehicle location information from the navigation unit and determine the overtaking lane regulation that applies to the jurisdiction. Some drivers may not know the regulation that prohibit using the overtaking lane as a travelling lane and thus may be more responsive to the alert associated with the traffic regulation. In addition, such alert may be more helpful and effective for the drivers travelling at the interstate highways or freeways. It should be appreciated that the alert with local overtaking lane regulation may be provided as a first alert at time T1.

Figure 4:
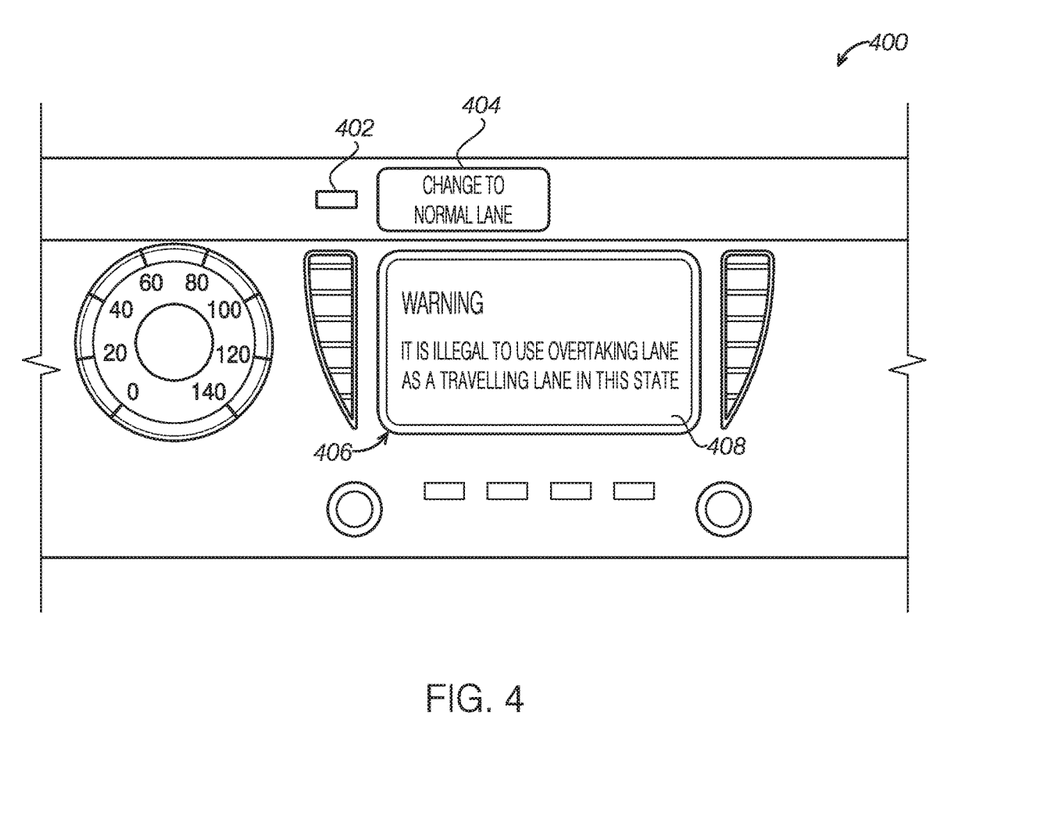
FIG. 4 shows an example instrument panel in which an example overtaking lane control may be implemented.

FIG. 4 shows an example instrument panel 400 in which an example overtaking lane control may be implemented. The instrument panel 400 may include an alert device 402 to issue an audible sound to warn a driver to return to a normal lane when certain conditions are met. The condition may include that the "safe return" status is logged and an elapsed time has reached a predetermined value since the "safe return" status is logged. Alternatively or additionally, a visual display 404 on a cluster of an instrument panel of the vehicle may be present to alert the driver to "change to a normal lane."

In some embodiments, the instrument panel 400 may include an HMI device 406 that has an aspect of overtaking lane control. The alert may be displayed on a screen 408 of the HMI device 406. The alert may warn the driver to change to the normal lane. Alternatively or additionally, the alert may include on information on traffic regulation. For example, the display may include a message "WARNING: it is illegal to use the overtaking lane as a travelling lane." In yet another embodiment, the display may include an alert informing the speed limit on the overtaking lane and warning the driver the speed of the vehicle is lower than the speed limit of the overtaking lane.

The overtaking lane control system and method of the present disclosure alert the driver of travelling on the overtaking lane and warn the driver to return to the normal lane when it is safe to do so. In this way, the overtaking lane can be used for its intended purpose and can prevent the violation of traffic regulation that prohibits using the overtaking lane as a normal travelling lane.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium in the engine control system.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An overtaking lane control system in a vehicle comprising:
a lane recognition device to recognize a road line configuration and output information on types of road lines;
an obstacle detection device to detect approaching vehicles in adjacent lanes and output information on the adjacent lanes; and
an overtaking lane control processor to issue a first alert to a driver to warn the driver to return to a normal lane from an overtaking lane when the overtaking lane control processor determines that the vehicle is travelling in an overtaking lane based on the information from the lane recognition device, has traveled in the overtaking lane for a first predetermined time and it is safe to change to the normal lane based on the information from the obstacle detection device, wherein the first predetermined time is an elapsed time when the vehicle has traveled in the overtaking lane and is recorded by a timer;
wherein the overtaking lane is designated for passing.

2. The overtaking lane control system of claim 1, wherein the lane recognition device includes a camera and an image recognition device that recognizes types and colors of road lines in front of the vehicle.

3. The overtaking lane control system of claim 2, wherein the camera and the image recognition device are installed in a lane keep assist system and the obstacle detection device is installed in a blind spot monitoring system in the vehicle.

4. The overtaking lane control system of claim 1, wherein the overtaking lane control processor further determines whether the driver has an intent to change the lane after the first alert is issued.

5. The overtaking lane control system of claim 4, wherein the overtaking lane control processor determines whether the driver has an intent to change the lane via a turn signal device or a steering wheel position sensor.

6. The overtaking lane control system of claim 5, wherein the overtaking lane control processor issues a second alert to the driver to warn the driver to return to the normal lane when the overtaking lane control processor determines that the driver has no intent to change the lane after the first alert and the vehicle has traveled in the overtaking lane for a second predetermined time and it is safe to return to the normal lane.

7. The overtaking lane control system of claim 1, further comprising a navigation processor to determine whether the vehicle travels on a highway or a freeway, and wherein the lane recognition device is activated when it is determined that the vehicle travels on the highway or the freeway.

8. The overtaking lane control system of claim 1, further comprising an alert device at an instrumental panel, wherein the first alert is lighting, a verbal display or an audio warning generated by the alert device.

9. The overtaking lane control system of claim 8, wherein the alert device is a human machine interaction (HMI) device in the vehicle.

10. An overtaking lane control system in a vehicle comprising:
a lane recognition device to recognize a road line configuration and output information on types of road lines;
an obstacle detection device to detect approaching vehicles in adjacent lanes and obstacles and output information on the adjacent lanes and the obstacles;
an overtaking lane control processor to receive the information from the lane recognition device, determine whether the vehicle is travelling in an overtaking lane, and issue a first alert alerting a driver to return to a normal lane from an overtaking lane when it is determined that the vehicle has traveled in the overtaking lane for a first predetermined time and it is safe to return to the normal lane based on the information from the obstacle detection device, wherein the first predetermined time is an elapsed time when the vehicle has traveled in the overtaking lane and is recorded by a timer; and an alert device to generate the first alert.

11. The overtaking lane control system of claim 10, wherein the alert device generates an audible warning, a visual display or a combination of the audible warning and the visual display.

12. The overtaking lane control system of claim 10, further comprising an HMI device and a navigation processor, wherein the overtaking lane control processor determines an applicable overtaking lane regulation based on a vehicle location information from the navigation processor and display the applicable overtaking lane regulation to the driver on the HMI device as one of alert formats.

13. The overtaking lane control system of claim 10, wherein the overtaking lane control processor issues a second alert when it is determined that the vehicle has traveled in the overtaking lane for a second predetermined time, the driver does not intend to change a lane and it is safe to return to the normal lane.

14. A method of overtaking lane control in a vehicle, comprising:

determining whether the vehicle is travelling in an overtaking lane based on information from a lane recognition device;

monitoring presence of approaching vehicles in adjacent lanes and obstacles;

recording a time when the vehicle has traveled in the overtaking lane; and issuing a first alert reminding a driver to return to a normal lane from the overtaking lane when a recorded time reaches a first predetermined value and it is safe to return to the normal lane, wherein the first predetermined value indicates an elapsed time when the vehicle has traveled in the overtaking lane;

wherein the overtaking lane is designated for passing.

15. The method of claim 14, further comprising logging into a "safe return to normal lane" status and wherein recording the time starts after the "safe return to normal lane" status is logged.

16. The method of claim 15, further comprising determining if the driver intends to return to the normal lane after issuance of the first alert and issuing a second alert when it is determined that the driver has no intent to return to the normal lane and it is safe to return to the normal lane.

17. The method of claim 16, wherein a driver's intent to return to the normal lane is determined by information from a turn signal device.

18. The method of claim 16, wherein a driver's intent to return to the normal lane is determined by information from a steering wheel position sensor.

19. The method of claim 16, wherein the "safe to return to normal lane" status is cancelled when the presence of the vehicles in the adjacent lane or obstacles are detected and recording time is restarted.

20. The method of claim 16, further comprising: obtaining a vehicle location information from a navigation processor, determining an applicable overtaking lane regulation; and including a message of the applicable overtaking lane regulation in at least one of the first and second alerts.

* * * * *